United States Patent [19]

Mortley et al.

[11] 3,898,591

[45] Aug. 5, 1975

[54] DISPERSIVE DELAY DEVICES

[75] Inventors: Wilfrid Sinden Mortley, Great Baddow; Stanley Frederick Clarke, Chelmsford; Stuart Norman Radcliffe, Shenfield, all of England

[73] Assignee: The Marconi Company Limited, Chelmsford, England

[22] Filed: Oct. 1, 1973

[21] Appl. No.: 402,251

[30] Foreign Application Priority Data

Oct. 5, 1972 United Kingdom .............. 45918/72

[52] U.S. Cl. .......... 333/30 R; 333/72; 343/17.2 PC; 343/100 LE

[51] Int. Cl. .......................... G01s 7/30; H03h 9/30

[58] Field of Search ......... 333/30 R, 72, 18, 20, 28, 333/31 R, 73 T; 179/15.55 R, 15.55 T; 325/42, 147, 347, 472–473; 343/17.2 R, 17.2 PC, 100 LE

[56] References Cited

UNITED STATES PATENTS

| | | | |
|---|---|---|---|
| 3,150,368 | 9/1964 | Price | 343/17.2 PC |
| 3,281,842 | 10/1966 | Cerar et al. | 343/17.2 PC |

*Primary Examiner*—James W. Lawrence

*Assistant Examiner*—Marvin Nussbaum

*Attorney, Agent, or Firm*—Baldwin, Wight & Brown

[57] ABSTRACT

A dispersive delay device for compressing a swept frequency pulse including a first dispersive delay line which produces an output pulse flanked by two side lobes and at least one other dispersive delay line which produces from the input signal a signal swept in the opposite direction which is used to reduce the amplitude of the side lobes.

10 Claims, 8 Drawing Figures

DISPERSIVE DELAY DEVICES

Figure 1A:
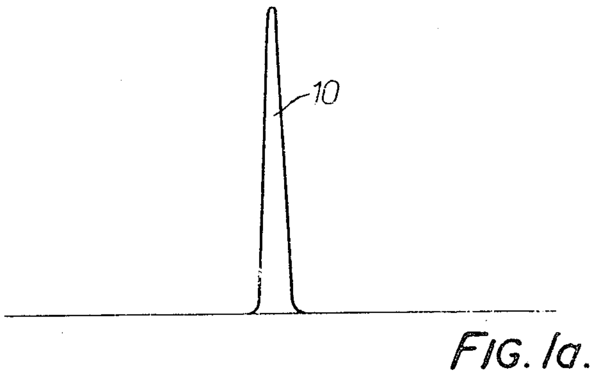

This invention relates generally to dispersive delay devices and in particular to a device for compressing a frequency swept pulse having a rectangular envelope.

As is well known in the art, a dispersive delay line delays an input signal by an amount dependent upon, and normally linearly related to, its frequency. Consequently, when a spike is fed into the line as input signal, the output has the form of a frequency swept pulse and conversely when the input to the delay line is a frequency swept pulse the output is ideally a voltage spike; or compressed pulse whose time width approximates to the inverse of the swept bandwidth provided, of course, that the sweep rate and direction of the input pulse match those of the delay line. However, in the latter case, the output signal contains an additional pair of side lobes which are caused to a large extent by the sharp leading and trailing edges of the input pulse.

Though the voltage amplitude of the side lobes is small by comparison with the main voltage spike at the output, the energy contained in the side lobes is proportionately greater as the duration of the side lobes is considerably greater than the compressed pulse. In an application such as pulse doppler radar the side lobes can contribute considerably to the energy of the background noise and it is therefore desirable to eliminate them. Since the side lobes are caused to a large extent by the edges of the input frequency swept pulses, it has been proposed to reduce the slope of the leading and trailing edges of the input pulse. However, with some types of transmitter valve it is impractical to slow the rate of rise and in others, even though this can be done, it is not easy to achieve in a sufficiently stable manner. An alternative proposal which has met with reasonable success consists of varying the rate of frequency sweep of the transmitted pulses the sweep being more rapid at the ends than in the middle. This technique, however, requires a considerable increase in the swept bandwidth as well as requiring a higher sweep rate, both of which can be disadvantageous.

The present invention seeks to reduce the amplitude of the side lobes not by altering the transmitted pulses but by suitably processing the received pulses.

In accordance with the present invention, a dispersive delay device for time compressing a frequency swept input pulse, includes dispersive delay means operative to produce from the input pulse an output signal in the form of central spike flanked by two side lobes and means for deriving from the input pulse at least one correction pulse which is frequency swept in the opposite direction to the input pulse and for subtracting the, or each, derived correction pulse from a, or a respective, side lobe so as to reduce the amplitude of the side lobe.

Preferably, the correction signals are derived from the input signal for reducing the amplitude of both side lobes, each signal being produced by a further dispersive delay means of which the sweep rate is one half of that of the first mentioned delay means. By virtue of this arrangement, the sweep direction of the output pulses of the further dispersive delay means is opposite to that of the input pulse.

Advantageously, both the first mentioned dispersive delay means and the further delay means may be formed by a set of transducers on a common piezoelectric substrate, such as a quartz crystal.

In a particularly preferred embodiment of the invention, the dispersive delay means are formed by surface wave delay lines each of which includes a sending and a receiving transducer formed on the same surface of a piezoelectric crystal and each comprising a pair of interdigitated comb-like electrodes, the spacing between adjacent fingers of at least one of the transducers being graded to achieve the desired dispersion.

Conveniently, the first mentioned dispersive delay means and the further delay means have a common sending transducer and the receiving transducers are arranged on the same side of the sending transducer.

In order to vary the insertion loss of the delay device with frequency, it is convenient to vary the overlap between adjacent fingers of the electrodes in the common sending transducer.

Whilst it is possible to design the receiving transducers in such a manner that the amplitude of the derived correction pulse or pulses matches that of the side lobes it is advantageous to produce a correction pulse having a greater amplitude than the side lobes and to attenuate the derived correction pulse by means of an attenuator, such as a capacitor.

Figure 1B:
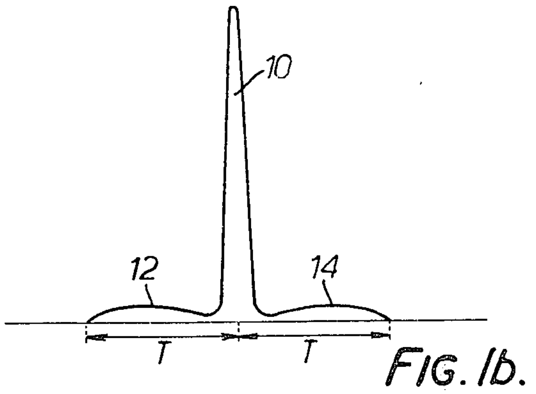
Figure 2:
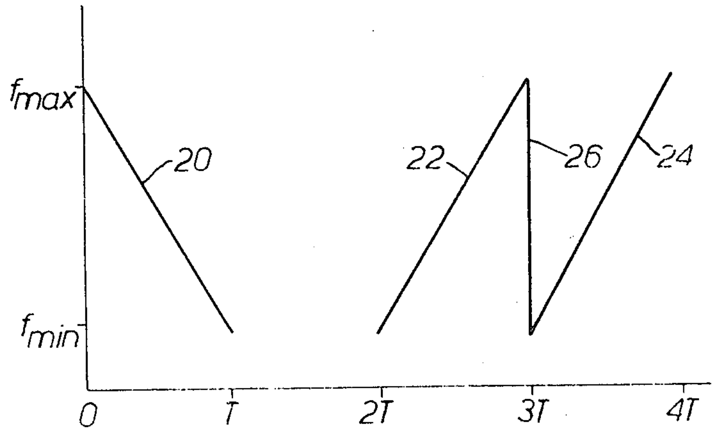
Figure 3:
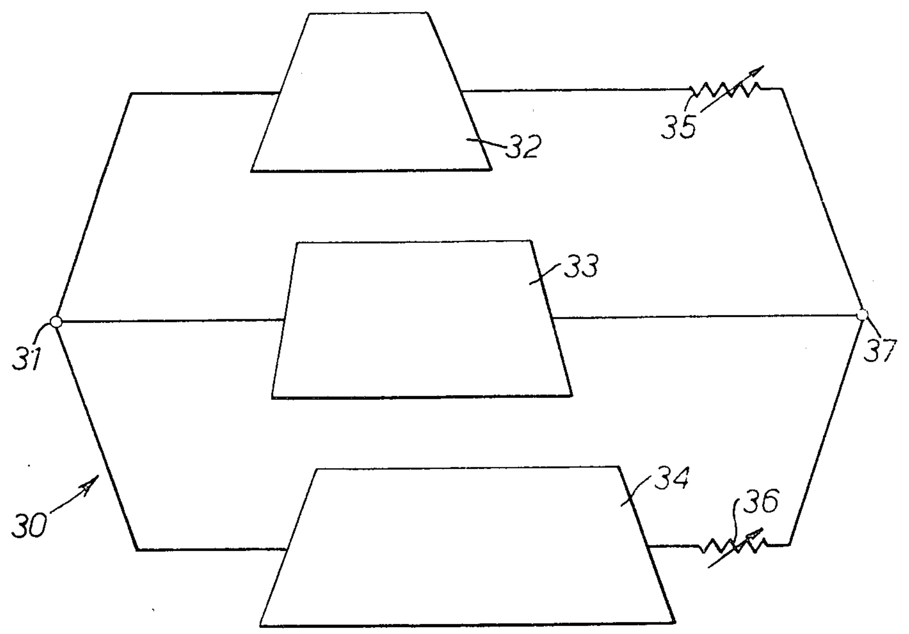
Figure 4:
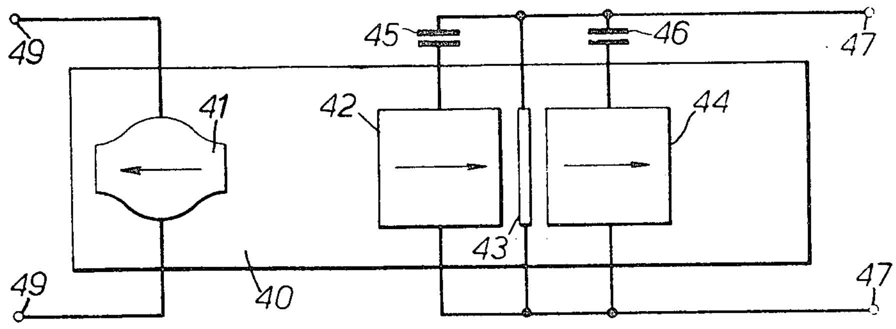
Figure 5:
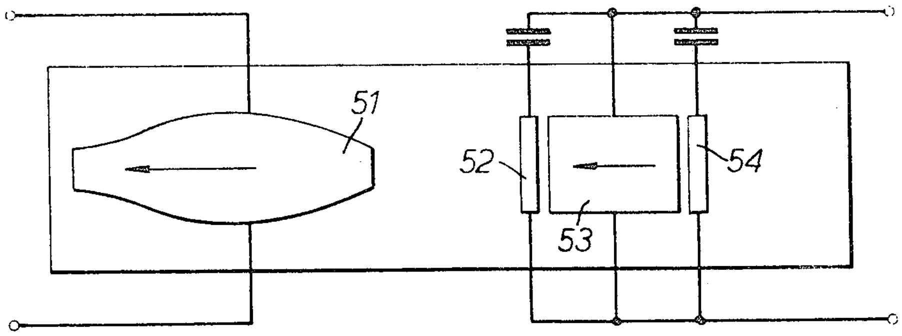
Figure 6A:
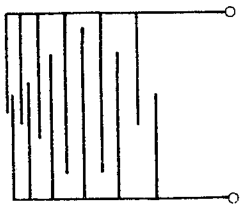
Figure 6B:
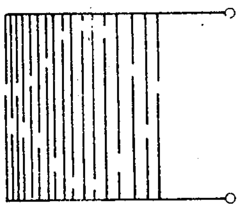

The invention will now be described further, by way of example, with reference to the accompanying drawings, in which:

FIG. 1*a* shows the desired configuration of a compressed pulse,

FIG. 1*b* shows the form of compressed pulse produced in practice, not showing minor side lobes having no relevance to the invention;

FIG. 2 is a graph of the time variation of the frequency of the input and output of a conventional delay line, FIG. 3 is a block diagram of the first embodiment of the invention, FIG. 4 is a sketch of a surface wave delay device embodying the invention, FIG. 5 is a sketch of an alternative surface delay device embodying the invention, and FIGS. 6*a* and 6*b* show diagrammatically alternative constructions of the sending transducers shown in FIGS. 4 and 5.

The problem experienced in compressing a rectangular frequency swept pulse of duration T by means of a single dispersive line may be better understood by reference to FIGS. 1*a* and 1*b* which show respectively the desired output of a dispersive delay device, consisting of a single spike 10, and the output obtainable in practice which contains additional side lobes 12, 14 flanking the central spike 10. As previously mentioned, these are caused to a large extent by the edges of the rectangular input pulse, which may be shown by Fourier analysis to contain the whole spectrum of frequencies within the bandwidth $F_D$ of the delay line. The frequency components are separated out in time by the delay line to form the side lobes 12 and 14 each of which has duration T. The latter duration T is a characteristic of the delay line which is matched to the duration of the input pulses. Assuming that the input pulse is so swept that frequency increases with time, then for an output spike to be produced the dispersive delay line must delay the low limit frequency by a time T more than the high limit frequency. Consequently, in the side lobes, the frequency sweep is from high to low i.e. the opposite direction to the input pulse.

The variation of the frequency of the input and output pulses is shown in FIG. 2 in which the input signal is represented by the line 20 and the output signals by lines 22, 24 and 26 corresponding to the central spike 10 and the two side lobes 12, 14. As a matter of convenience, the spike 10 (line 26 in FIG. 2) has been shown as occurring at time 3T but it will be appreciated that the centre frequency delay will depend on the design of the delay line and is to some extent arbitrary.

In order to cancel side lobes, the embodiment of the invention shown in FIG. 3 produces from the input signal a pair of correcting signals which are swept in the opposite direction to the input and which are added out of phase to the side lobes 12, 14.

The input terminal 31 of the delay device 30 is connected to three delay lines 32, 33 and 34. The three delay lines are dispersive though they have differing centre frequency delays. Furthermore the lines 32 and 34 have a sweep rate equal to half the sweep rate of the line 33. The outputs of the delay line 32, 34 are attenuated by attenuators 35, 36 and added to the output of the line 33 at the output terminal 37 of the delay device.

The line 33 has a centre frequency delay 2.5T (this figure being given only as an example), a bandwidth from $f_{min}$ to $f_{max}$ and sweeps from $f_{min}$ to $f_{max}$ in a period T, so that the output is as shown in FIG. 2 when a pulse of duration T is received. The line 32 has a centre frequency delay ½T less than line 33 again a bandwidth from $f_{min}$ to $f_{max}$ but sweeps over the bandwidth in a time 2T, the high frequencies suffering the greatest delay. As a result the output of line 32 has the same frequency variation as the side lobe 22 and coincides in time with the latter side lobe. Thus, when attenuated by attenuator 35 and subtracted from the output signal of line 33 at the output terminal 37 the output signal of the delay line 32 at least partly cancels the side lobe 12. Similarly, the output signal of line 34, which has a centre frequency delay ½T greater than line 33, reduces the side lobe 14.

FIG. 4 is a sketch of the layout of the electrodes of a surface wave device for realising the invention. Four transducers 41, 42, 43 and 44, having the form of gratings, are deposited on a quartz crystal or other piezoelectric substrate 40. Transducer 41 is a common sending transducer and the other three are receiving transducers. The sending transducer 41 is a graded grating consisting of a pair of interdigitated comb-like electrodes (described in greater detail hereinafter with reference to FIG. 6) in which the distance between adjacent electrodes varies gradually along the length of the transducer, being finest at its left hand end (as viewed in FIG. 4). Thus the higher frequencies are launched from the left and have to travel a greater distance before reaching the receiving transducers, so that these frequencies suffer the greatest delays. This is represented by the arrows in FIG. 4 which point in the direction of increasing frequency.

If the length of transducer 41 is such that the upper limiting frequency is delayed by a time T more than the lower limiting frequency then the elastic waves produced by all the frequencies in the input pulse will overlap and a single wavefront will travel down the crystal 40 from left to right. This wavefront when detected by transducer 43 will generate an output pulse as previously described. The different frequencies in the wavefront will also be successively detected in the transducers 42, 44 which produce pulses swept from low to high frequencies which are added after attenuation in capacitors 45, 46 to the output of transducers 43, the resultant output being developed across electrodes 47.

Thus, the combination of the sending transducer 41 with each receiving transducer forms a delay line, the combination of transducers 41 and 42 corresponding to delay line 32 in FIG. 3, the combination 41, 43 to delay line 33 and so forth. It would naturally be possible to have different arrays of transducers to give the same dispersion factors and group delays as the embodiment shown in FIG. 4 and one such alternative is shown in FIG. 5. In this embodiment the sending transducer 51 introduces a delay of 2T over the bandwidth of the input signal so that the ungraded transducers 52, 54 detect a correction signal. The receiving transducer 53 is however graded in a direction to compress the pulse and produce an output as shown in FIG. 1*b*. In view of the general similarity between the embodiments it is believed that no further explanation of FIG. 5 is required.

A still further and preferred alternative is to arrange for all the gratings to be graded. This enables all the gratings to have a large number of fingers as opposed to the previously given examples where the number of fingers in the ungraded gratings is severely limited. For example, in the embodiment of FIG. 4, if the gratings 42 were to conform exactly to the desired response their edges would meet, leaving no space on the crystal for transducer 43. Thus the presence of transducer 43 affects the responses of the other two transducers at the limiting frequencies, and it is therefore preferred for transducer 43 to be as narrow as possible. This requirement however conflicts with the need to minimize insertion losses.

It is therefore preferred to adopt a configuration similar to that of FIG. 5 but in which the transducers 52 and 54 are graded and wider than illustrated and the transducers 51 and 53 are narrower by a corresponding amount.

The outline of transducers 41 and 51 in FIGS. 4 and 5 is intended to illustrate that the overlap of the fingers in the electrodes is not uniform but varies in order to weight the response of the delay line such that the insertion loss is highest at the limiting frequencies. This may be done by constructing the electrodes as shown in FIGS. 6*a* and 6*b*. The construction of FIG. 6*b* is preferred as the density variation at the surface of the crystal is more uniform. The two constructions have in common that the overlap between adjacent fingers is greatest at the centre of the transducer where the spacing corresponds to the centre frequency of the bandwidth of the transducer. Alternatively weighting may be carried out by varying the ratio of finger width to gap width.

We claim:

1. A dispersive delay device for time compressing a frequency swept input pulse, including dispersive delay means operative to produce from the input pulse an output signal in the form of a central spike flanked by two side lobes and means for deriving from the input pulse at least one correction pulse which is frequency swept in the opposite direction to the input pulse and for subtracting the, or each, derived correction pulse from a, or a respective, side lobe so as to reduce the amplitude of the side lobe.

2. A delay device as claimed in claim 1 in which the, or each, correction pulse has a greater amplitude than the side lobes and means, such as a capacitor, are provided for attenuating the correction pulse.

3. A dispersive delay device as defined in claim 1 wherein the, or each, correction pulse corresponds in time only to a respective side lobe.

4. A dispersive delay device for time compressing a 'requency swept input pulse, including dispersive delay means operative to produce from the input pulse an output signal in the form of a central spike flanked by two side lobes and means for driving from the input pulse at least one correction pulse which is frequency swept in the opposite direction to the input pulse and for subtracting the, or each, derived correction pulse from a, or a respective, side lobe so as to reduce the amplitude of the side lobe, and in which two correction signals are derived from the input signal for reducing the amplitude of both side lobes, each signal being produced by a further dispersive delay means of which the sweep rate is one half of that of the first mentioned delay means.

5. A delay device as claimed in claim 4, in which both the first mentioned dispersive delay means and the further delay means are formed by a set of transducers on a common piezoelectric substrate, such as a quartz crystal.

6. A delay device as claimed in claim 5, in which the dispersive delay means are formed by surface wave delay lines each of which includes a sending and a receiving transducer formed on the same surface of a piezoelectric crystal and each comprising a pair of interdigitated comb-like electrodes, the spacing between adjacent fingers of at least one of the transducers being graded to achieve the desired dispersion.

7. A delay device as claimed in claim 6, in which the first mentioned dispersive delay means and the further delay means have a common sending transducer and the receiving transducers are arranged on the same side of the sending transducer.

8. A delay device as claimed in claim 7, in which in order to vary the insertion loss of the delay device with frequency, the overlap between adjacent fingers of the electrodes in the common sending transducer is varied.

9. A dispersive delay device for time compressing a frequency swept input pulse, comprising in combination:

dispersive delay means connected to the input pulse and having a center frequency delay $n$T and a bandwidth $f_{min}$ to $f_{max}$ for sweeping from $f_{min}$ to $f_{max}$ in a time period T to produce a first output signal in the form of a central spike flanked by two side lobes;

at least one further dispersive delay means connected to the input signal and having a center frequency delay $(n\pm\frac{1}{2})$T and a bandwidth $f_{min}$ to $f_{max}$ for sweeping from $f_{min}$ to $f_{max}$ in a time period 2T to produce a second output signal corresponding in time and frequency content to one of said side lobes; and means for subtracting said second output signal from said first output signal substantially to eliminate said one side lobe.

10. A dispersive delay device as defined in claim 9 wherein the center frequency delay of said further dispersive delay means is $(n+\frac{1}{2})$T and including a third dispersive delay means connected to said input pulse and having a center frequency delay $(n-\frac{1}{2})$T and a bandwidth $f_{min}$ to $f_{max}$ for sweeping from $f_{min}$ to $f_{max}$ in a time period 2T to produce a third output signal corresponding in time and frequency content to the other of said side lobes, and means for subtracting said third output signal from said first output signal substantially to eliminate said other side lobe.

* * * * *